United States Patent
Chandran et al.

(10) Patent No.: US 7,798,122 B2
(45) Date of Patent: Sep. 21, 2010

(54) DRIVE-BY-WIRE THROTTLE CONTROL APPARATUS

(75) Inventors: Anand Chandran, Springfield, IL (US); Al Cable, Springfield, IL (US); Bindu Philip, Bangalore (IN); Rick Holzmacher, Springfield, IL (US); Gangl Rajula Reddy, Bangalore (IN); Shakil Moonamkandy, Bangalore (IN); Ravindra Gudi, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 12/204,091

(22) Filed: Sep. 4, 2008

(65) Prior Publication Data

US 2010/0057322 A1 Mar. 4, 2010

(51) Int. Cl.
*F02D 11/10* (2006.01)
*F02D 11/04* (2006.01)
(52) U.S. Cl. ................................. 123/399; 123/400
(58) Field of Classification Search .............. 123/399, 123/400, 376, 319; 180/170, 174
See application file for complete search history.

(56) References Cited

U.S. PATENT DOCUMENTS

| 5,233,882 | A  | 8/1993  | Byram et al. ............... 74/514 |
| 6,276,230 | B1 * | 8/2001  | Crum et al. ............... 74/551.9 |
| 6,467,787 | B1 | 10/2002 | Marsh ..................... 280/279 |
| 6,598,695 | B1 | 7/2003  | Menjak et al. ............ 180/402 |
| 6,705,419 | B2 | 3/2004  | Menjak et al. ............ 180/402 |
| 6,708,794 | B2 | 3/2004  | Menjak et al. ............ 180/402 |
| 7,000,498 | B2 | 2/2006  | Hancock et al. ........... 74/544 |
| 7,017,704 | B2 | 3/2006  | Kapaan et al. ........... 180/315 |
| 2004/0012175 | A1 | 1/2004  | Kapaan et al. ........... 280/731 |
| 2005/0223836 | A1 | 10/2005 | Gibson ..................... 74/478 |
| 2008/0114523 | A1 * | 5/2008  | Dugas et al. ............... 701/101 |

* cited by examiner

*Primary Examiner*—Mahmoud Gimie
(74) *Attorney, Agent, or Firm*—Ingrassia Fisher & Lorenz, P.C.

(57) ABSTRACT

A drive-by-wire throttle control apparatus and method includes a variable resistance sensor. A contact arm can be mechanically connected between a thumb lever and a variable resistance sensor. The variable resistance sensor possesses a resistive film that includes a fixed resistor and a variable resistor configured from a carbon film. As the thumb lever rotates, the contact arm traverses the resistive film, thereby altering the resistance of the variable resistor, determining the position of the thumb lever and thereafter generating a signal based on the sensed position. The signal can be sent to an ECU (Electronic Control Unit) in the form of a varying voltage, which in turn controls the throttle of a vehicle.

14 Claims, 4 Drawing Sheets

DRIVE-BY-WIRE THROTTLE CONTROL APPARATUS

TECHNICAL FIELD

Embodiments are generally related to variable resistance sensors. Embodiments are also related to throttle control devices.

BACKGROUND OF THE INVENTION

A throttle controls the flow of air, or air and fuel, which are inducted into an internal combustion engine to thereby control the power produced by the engine. Engine power defines the speed of the engine or vehicle to which it is attached, under a given load condition, and thus, reliable control of the throttle setting is important. Vehicles are known to utilize throttle controls that are mechanical and electrical in nature. For example, off-road vehicles such as an ATV (All Terrain Vehicle) or a snowmobile operates with a small gasoline powered engine. To operate such engines, the operator activates a thumb lever or twist grip mounted on a handlebar that controls the engine throttle.

The thumb lever or throttle is usually mounted to and/or integrated with the right handlebar in order to control engine throttle. As the rider grips this handlebar, the rider's thumb operates the throttle by pushing the throttle against the handle bar and holding it in place. The throttle is designed to provide a range of speeds as the throttle is depressed. If the throttle is held fully open, the highest speeds can be attained. However, holding the throttle in between "off" and "full" produces an intermediate level of speed. To prevent the throttle from "sticking" in the open position, a spring is typically used to force the throttle back to the off position if the throttle is released.

In the majority of prior art designs, a direct mechanical linkage controls the throttle, typically in the form of a cable running from the thumb lever or twist grip to a throttle mechanism associated with the engine. Such throttle actuation is generally mechanical in nature and hence, the cable is subject to a great deal of wear and tear. Although mechanical linkages are simple and intuitive, such components cannot readily be adapted to electronically control an engine such as may be desired with sophisticated emissions reduction systems or for other features such as, for example, automatic vehicle speed control. The cable also tends to become stuck in adverse weather conditions such as, for example, snow, ice accumulation, driving on a dirt road, etc. Further, frequent servicing and monitoring of the throttle mechanism is required to maintain the device in proper working condition. Hence, it is believed that a solution to these problems involves the implementation of an improved drive-by-wire, throttle control apparatus associated with a variable resistance sensor, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved drive-by-wire throttle control apparatus.

It is another aspect of the present invention to provide for an improved throttle control apparatus associated with a variable resistance sensor.

The aforementioned aspects and other objectives and advantages can now be achieved as described herein. A drive-by-wire throttle control apparatus and method of configuring the same are disclosed, which include the use of a variable resistance sensor. A contact arm can be mechanically connected between a thumb lever and the variable resistance sensor. The variable resistance sensor can be configured to possess a resistive film that includes a fixed resistor and a variable resistor configured from a carbon film. As the thumb lever rotates, the contact arm travels over the resistive film, thereby altering the resistance of the variable resistor, determining the position of the thumb lever and thereafter generating a signal based on the sensed position. The signal can be electrically transmitted to an ECU (Electronic Control Unit) utilizing electrical wires in the form of a varying voltage, which in turn controls the throttle of a vehicle.

At 'zero acceleration' position of the thumb lever, the variable resistor value can be adjusted such that the output voltage is 0V. At the 'maximum acceleration' position of the thumb lever, the variable resistor value can get adjusted such that the output voltage is approximately, for example, 5V. Such drive-by-wire technology eliminates the need for a throttle cable which is presently utilized in, for example, ATV's and snowmobiles. The variable resistance sensor can be utilized for throttle control in off road vehicles, thereby eliminating the need for cables and other mechanical parts. Such a sensing technology is not subject to wear and tear and the life cycle of the throttle control apparatus can be increased tremendously, which also does not require regular maintenance.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
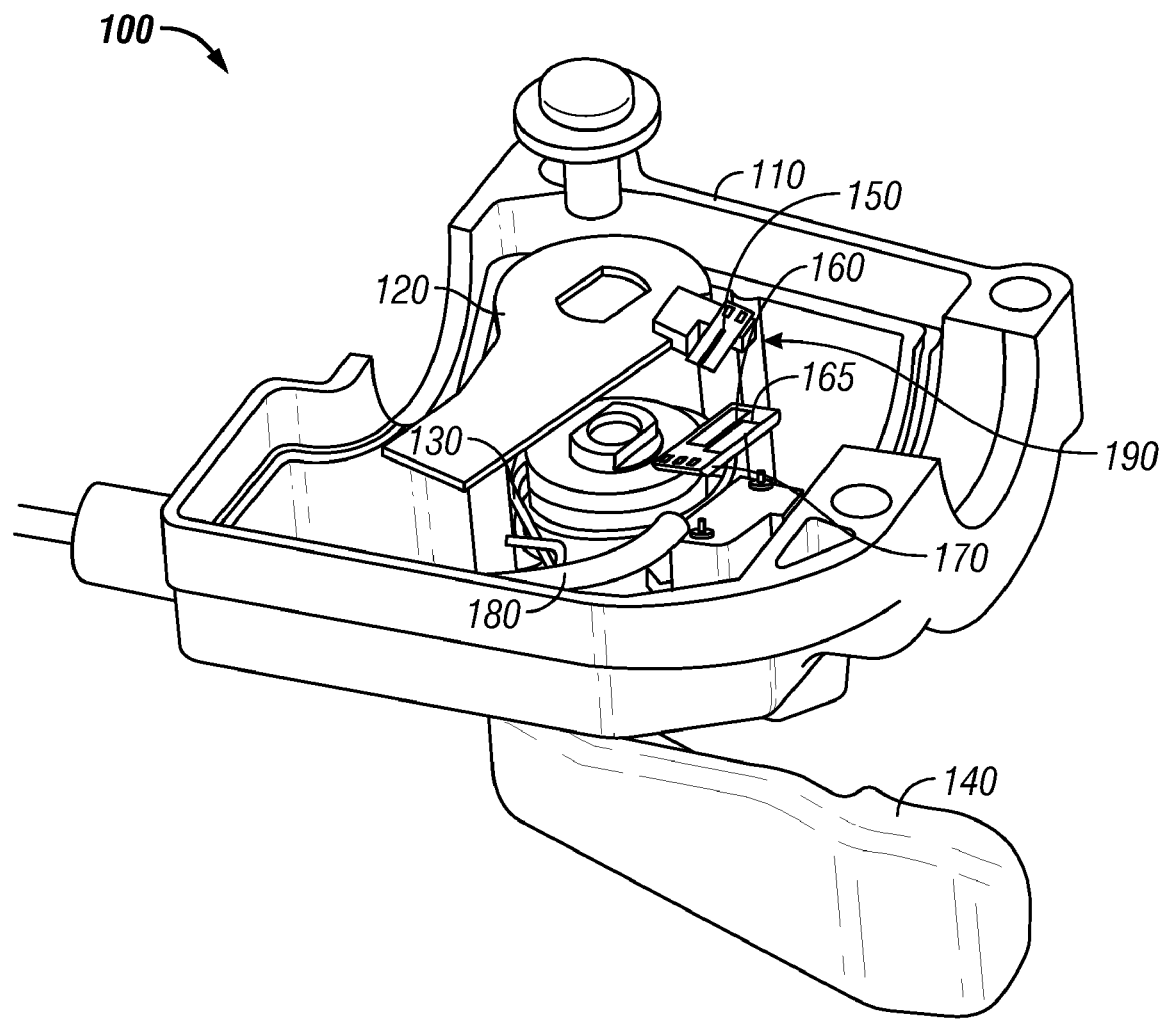
FIG. 1 illustrates a perspective view of a drive-by-wire throttle control apparatus with a variable resistance sensor, which can be implemented in accordance with a preferred embodiment.

FIG. 1 illustrates a perspective view of a drive-by-wire throttle control apparatus 100 with a variable resistance sensor 190, which can be implemented in accordance with a preferred embodiment. Note that in FIGS. 1-3, identical or similar parts or elements are generally indicated by identical reference numerals. Preferably, the throttle control apparatus 100 includes the variable resistance sensor 190 mounted thereon for position sensing. The throttle control apparatus 100 generally includes a thumb lever 120 associated with a handle 140 and a torsion spring 130 placed inside a mounting bracket 110. The thumb lever 120 associated with the handle 140 has a long, extended portion. The length of the handle 140 can be adjusted as well, depending on the preferences of different riders.

The thumb lever 120 can be mounted on the handle bar 140 utilizing the torsion spring 130, which controls throttle of the engine. The throttle control apparatus 100 further includes a movable contact or a contact arm 150, which can be mounted on the thumb lever 120. The thumb lever 120 rotates corresponding to the opening of a throttle valve (not shown) and is further provided with a resistive film comprising a fixed resistor 160 and a variable resistor 165 on a circuit board 170. The fixed resistor 160 and the variable resistor 165 are preferably configured from, for example, a carbon film. It can be appreciated, of course, that other types of film may be utilized in place of the carbon film, depending upon design considerations. The PCB 170 comprises the variable resistance sensor 190 in order to determine position of the thumb lever 120 and generates a signal based on the sensed position. The contact arm 150 can be heat stacked to the thumb lever 120 so that as the thumb lever 120 rotates the contact arm 150 and travels over the resistive films 160 and 165.

Figure 2:
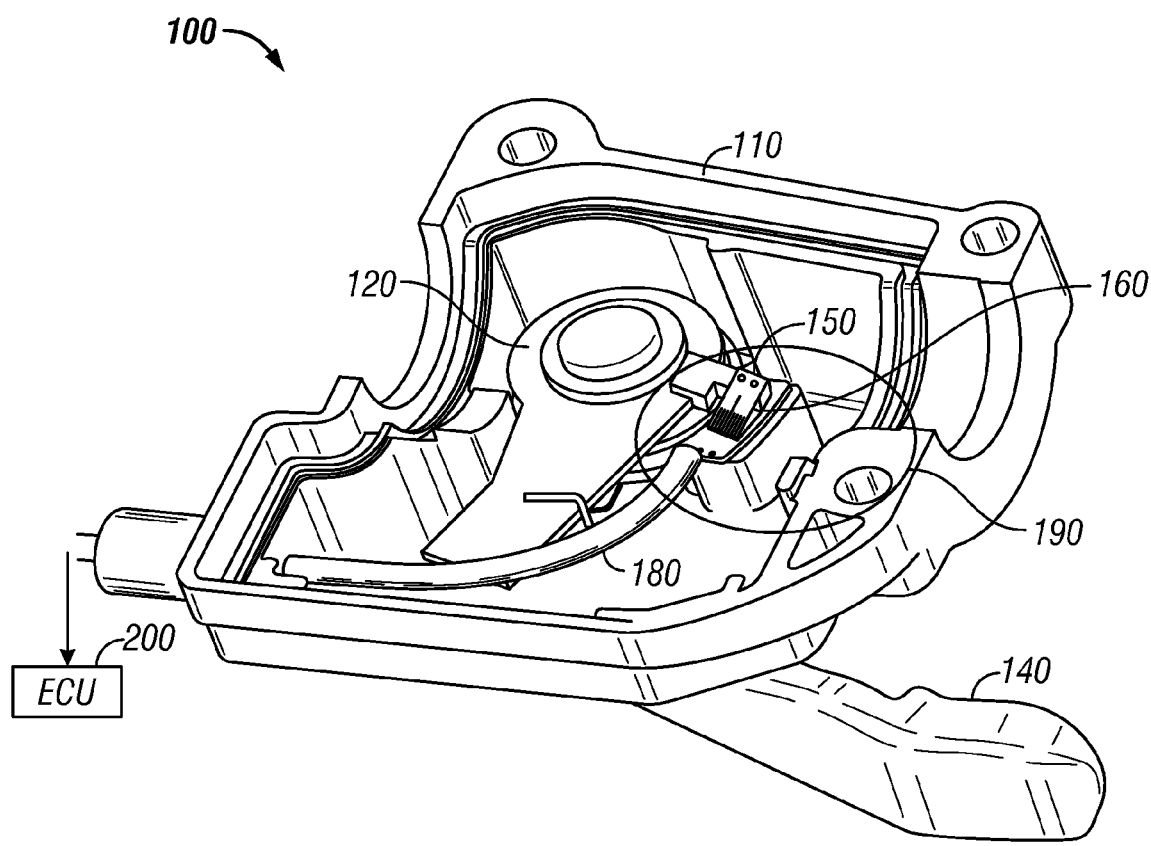
FIG. 2 illustrates an assembled view of the drive-by-wire throttle control apparatus with the variable resistance sensor, which can be implemented in accordance with a preferred embodiment.

FIG. 2 illustrates an assembled view of the drive-by-wire throttle control apparatus 100 with the variable resistance sensor 190, which can be implemented in accordance with a preferred embodiment. The extended portion of the handle 140 terminates at the mounting bracket 110. The mounting bracket 110 is preferably operably designed and configured to mount the thumb lever 120 to the handle bar 140. The thumb lever 120 is preferably received within the mounting bracket 110 and preferably coaxial therewith, although the thumb lever 120 can be received in other positions and or orientations. The preferred thumb lever 120 is a twist throttle, which receives the handle bar 140 for rotation thereabout.

The mounting bracket 110 comprises a curved body, as depicted in FIGS. 1-2. In a preferred embodiment, the thumb lever 120 can be molded in one piece from a plastic or another similar material, depending upon design considerations. Of course, the thumb lever 120 can be configured from other materials as well such as, for example, metal. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

The variable resistance sensor 190 can be located on the thumb lever 120 so that the sensor 190 can directly monitor the position of the thumb lever 120. When the thumb lever 120 rotates, the rake contact arm 150 travels over the resistive films 160 and 165. Hence, the resistance of the variable resistor 165 changes and the position of the thumb lever 120 can be determined. A signal can be generated based on the sensed position. The variable resistance sensor 190 can be a potentiometer and therefore, provides a variable resistance dependent upon the position of the thumb lever 120. The sensor signal can be utilized by the engine control unit 200 as an input to its control system.

Figure 3:
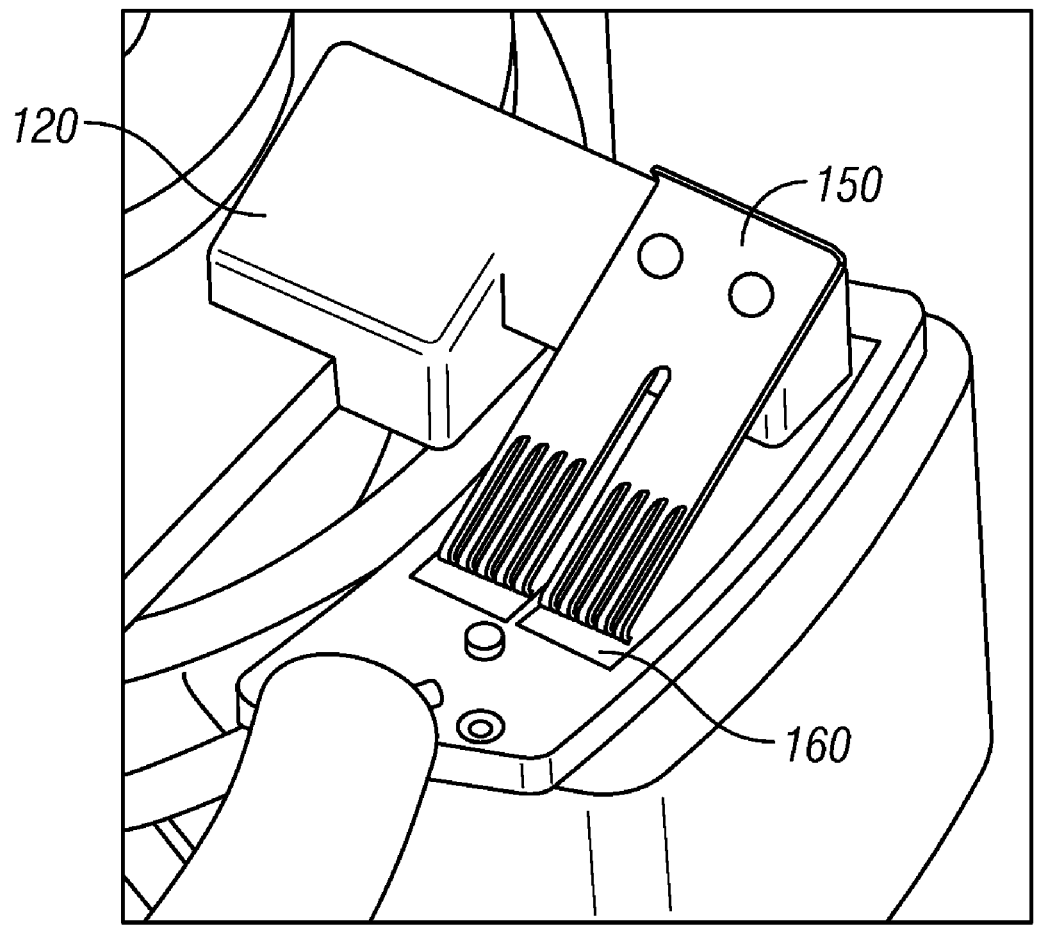
FIG. 3 illustrates a perspective view of a contact arm mechanically connected between a thumb lever and the variable resistance sensor, which can be implemented in accordance with a preferred embodiment.

FIG. 3 illustrates a perspective view of the contact arm 150 mechanically connected between the thumb lever 120 and the variable resistance sensor 190, in accordance with a preferred embodiment. Drive-by-wire technology in the automotive industry replaces the traditional mechanical and hydraulic control systems with electronic control systems. The signal can be sent to the ECU 200 utilizing electrical wires through a wire harness 180, which is converted to a voltage value that is used to control the throttle of a vehicle. At the 'zero acceleration' position of the thumb lever 120, the value of the variable resistor 160 can be adjusted such that the output voltage is 0V. At the 'maximum acceleration' position of the thumb lever 120, the value of the variable resistor 160 can be adjusted such that the output voltage is around 5V. The drive-by-wire technology eliminates the need for a throttle cable such as in ATV's and snowmobiles.

Such a sensing technology does not possess wear and tear and the life cycle of the throttle control apparatus 100 can be increased tremendously, which does not require regular maintenance. The ECU 200 determines the required throttle position by calculations from data measured by other sensors such as an accelerator pedal position sensor, engine speed sensor, vehicle speed sensor, etc. The variable resistance sensor 190 can be utilized as a throttle control in off road vehicles eliminating the need of cables and other mechanical parts that is used traditionally.

Figure 4:
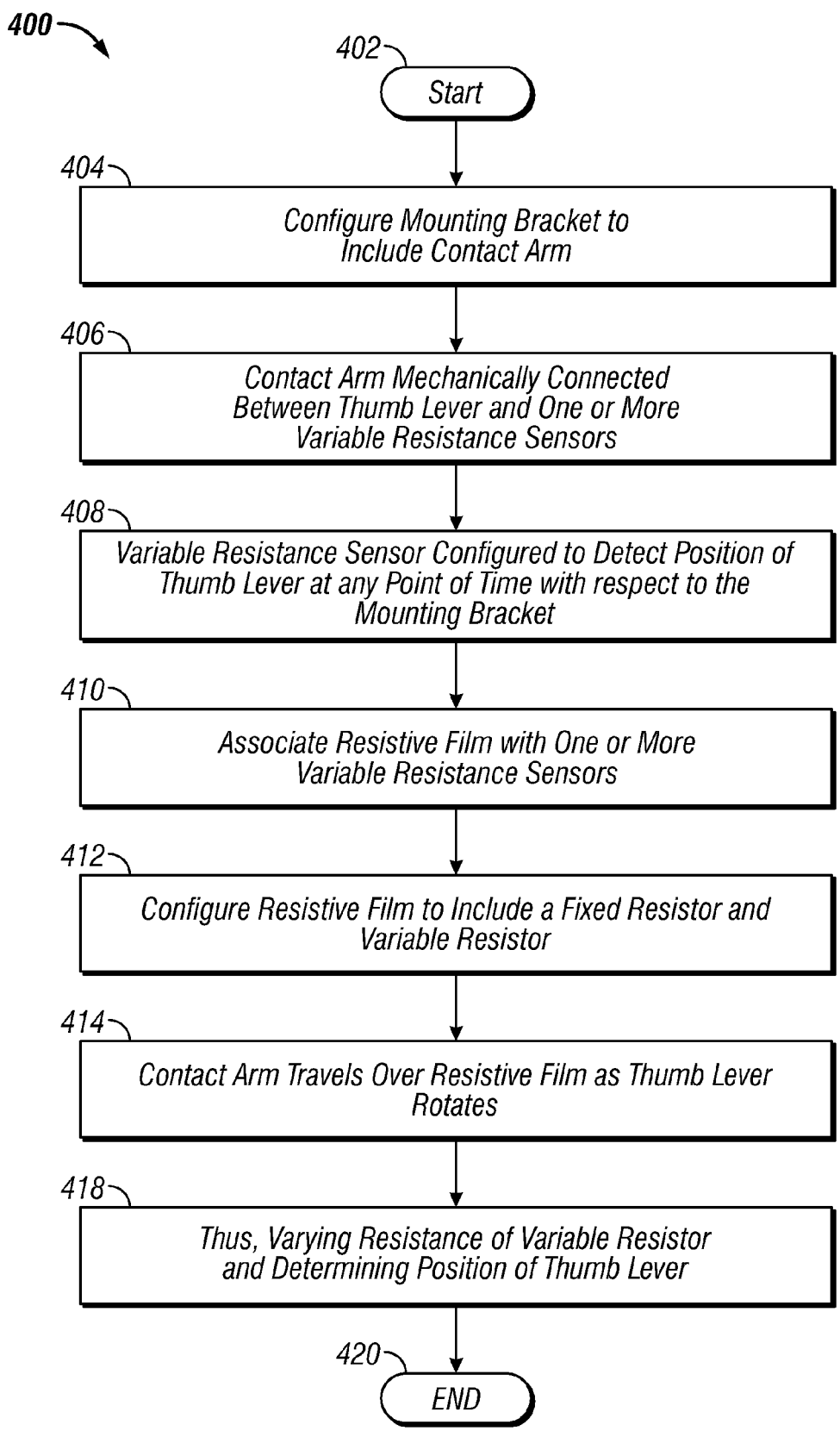
FIG. 4 illustrates a high-level flow chart depicting a method for configuring the throttle control apparatus, in accordance with an alternative embodiment.

FIG. 4 illustrates a high-level flow chart depicting a method 400 for configuring the throttle control apparatus 100, in accordance with an alternative embodiment. As indicated at block 402, the process begins. Thereafter, as illustrated at block 404, mounting bracket 110 can be configured to include contact arm 150. As depicted next at block 406, the contact arm 150 can be mechanically connected between the thumb lever 120 and one or more variable resistance sensor(s) 190.

As illustrated thereafter at block 408, the variable resistance sensor(s) 190 can detect the position of said thumb lever 120 at any point of time with respect to the mounting bracket 110. Next, as described at block 410, the resistive film can be associated with one or more variable resistance sensors, such as, for example, sensor 190. Thereafter, as indicated at block 412, such a resistive film can be configured to include the fixed resistor 160 and the variable resistor 165. Thus, as depicted next at block 414, the contact arm 150 can then travel over such a resistive film as the thumb lever 120 rotates, thereby, as indicated next at block 418, varying the resistance of the variable resistor 165 and determining the position of the thumb lever 120.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A drive-by-wire throttle control apparatus, comprising:
    a mounting bracket;
    a thumb lever rotationally mounted on the mounting bracket;
    a resistive film fixedly mounted on the mounting bracket, said resistive film comprising a fixed resistor and a variable resistor;
    a contact arm mechanically connected to the thumb lever and engaging the resistive film, said contact arm configured to travel over said resistive film as said thumb lever rotates, thereby varying a resistance of said variable resistor; and
    a variable resistance sensor coupled to the resistive film and configured to determining a position of said thumb lever from at least the resistance of said variable resistor.

2. The apparatus of claim 1 wherein said variable resistance sensor is capable of detecting a position of said thumb lever with respect to a handle bar at any point of time with respect to said mounting bracket.

3. The apparatus of claim 1 further comprising an electronic control unit associated with said variable resistance sensor.

4. The apparatus of claim 3 wherein said electronic control unit is connected to said variable resistance sensor.

5. The apparatus of claim 4 wherein said electronic control unit is connected to said variable resistance sensor utilizing a plurality of electrical wires in order to generate a signal in a form of a varying voltage based on a sensed position, in order to control a throttle of a vehicle and thereby eliminate a need for a throttle cable.

6. The apparatus of claim 1 wherein said thumb lever at a zero acceleration position adjusts a value of said variable resistor to thereby generate an output voltage of 0 Volts.

7. The apparatus of claim 1 wherein said thumb lever at a maximum acceleration position adjusts a value of said variable resistor to thereby generate an output voltage of approximately 5 Volts.

8. A drive-by-wire throttle control method, comprising:
configuring a mounting bracket to include a contact arm mechanically connected between a thumb lever and at least one variable resistance sensor, wherein said at least one variable resistance sensor detects a position of said thumb lever at any point of time with respect to said mounting bracket;
associating a resistive film with said at least one variable resistance sensor; and
configuring said resistive film to comprise a fixed resistor and a variable resistor, wherein said contact arm travels over said resistive film as said thumb lever rotates, thereby varying a resistance of said variable resistor and determining a position of said thumb lever.

9. The method of claim 8 wherein said at least one variable resistance sensor is capable of detecting a position of said thumb lever with respect to a handle bar at said any point of time with respect to said mounting bracket.

10. The method of claim 8 further comprising associating an electronic control unit with said at least one variable resistance sensor.

11. The method of claim 10 further comprising connecting said electronic control unit to said at least one variable resistance sensor.

12. The method of claim 11 further comprising connecting said electronic control unit to said at least one variable resistance sensor utilizing a plurality of electrical wires in order to generate a signal in a form of a varying voltage based on a sensed position, in order to control a throttle of a vehicle and thereby eliminate a need for a throttle cable.

13. The method of claim 8 wherein said thumb lever at a zero acceleration position adjusts a value of said variable resistor to thereby generate an output voltage of 0 Volts.

14. The method of claim 8 wherein said thumb lever at a maximum acceleration position adjusts a value of said variable resistor to thereby generate an output voltage of approximately 5 Volts.

* * * * *